May 30, 1961 R. P. BROWN 2,986,137
BRAZIER AND GRILL LIFTING MECHANISM THEREFOR
Filed Aug. 8, 1957
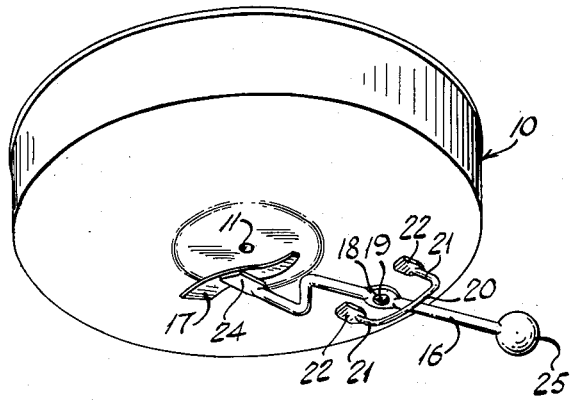
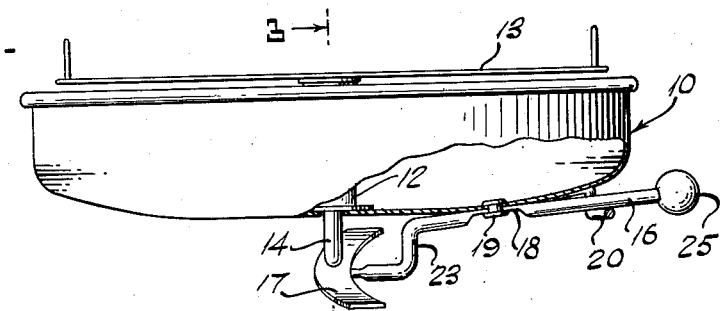
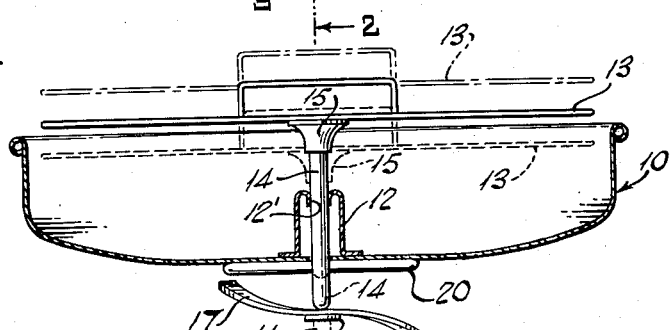
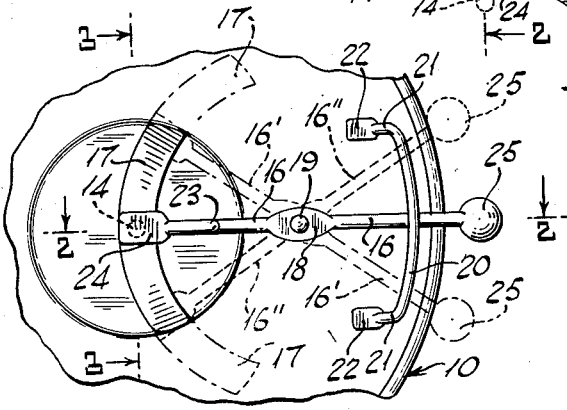
INVENTOR
ROBERT P. BROWN
BY
ATTORNEY

2,986,137
BRAZIER AND GRILL LIFTING MECHANISM THEREFOR

Robert P. Brown, White Plains, N.Y., assignor to Poloron Products, Inc., New Rochelle, N.Y., a corporation of New York Filed Aug. 8, 1957, Ser. No. 676,961
1 Claim. (Cl. 126—25)

This invention relates to braziers and more specifically to an improved mechanism for adjusting the height of a grill relative to the bed of coals or other heat source in the brazier.

Numerous grill lifting devices for braziers have been proposed but have not been found to be satisfactory for a number of reasons. For instance, most known devices utilize vertically reciprocal means or rotary devices for raising and lowering the grill which, by reason of their nature, require substantial space which complicates storage and packing problems. Moreover, such arrangements frequently embody a number of levers and pivots which add materially to the cost of the resultant product.

This invention overcomes the disadvantages of prior known devices and provides a novel and improved means for adjusting the height of a grill above the heated coals in the brazier and characterized by its simplicity, compactness and relatively low cost.

Another object of the invention resides in the provision of novel and improved grill lifting means for braziers wherein vertical movement is imparted to a grill through horizontal movement of a single lever that will stay in a set position without the need of auxiliary latches or other engaging means.

A still further object of the invention resides in the provision of a novel and improved lifting means for grills that enables the grill to be adjusted to any position within the span of operation of the lifting mechanism.

A still further object of the invention resides in the novel and improved grill lifting mechanism for braziers.

The above and other objects and advantages of the invention will become more apparent from the following description and accompanying drawings forming part of this application.

In the drawings:

Fig. 1 is a perspective view of a brazier in accordance with the invention;

Fig. 2 is a side elevational view of the embodiment of the invention shown in Fig. 1;

Fig. 3 is a cross sectional view of Fig. 2 taken along the line 3—3 thereof; and Fig. 4 is a fragmentary view of the bottom of the brazier as shown in Figs. 1-3 to illustrate the adjustment of the grill lifting means.

A brazier in accordance with the illustrated embodiment of the invention includes a circular bowl or fuel receiver generally denoted by the numeral 10. This receiver is relatively shallow in depth and includes a central opening 11 and a hub 12 secured to the bowl, the latter having an opening 12' in alignment with the opening 11.

A grill 13 which may be in the form of a wire grate has a central supporting post 14 engaging the openings 11 and 12' and extending below the bottom of the bowl 10. The lowest position of the grill may be determined by any suitable means as, for instance, the depth of the collar 15 connecting the post 14 to the grill 13 and the height of the hub 12.

The adjustment of the vertical post 14 of the grill 13 is accomplished by a novel and improved arrangement of a lever 16 and a cooperating cam 17. The lever 16 has a flattened section 18 about midway of its effective length and is secured to the bowl by means of a rivet 19 or other suitable fastening means extending through this flattened section. Downward motion of the lever is prevented by a transverse bar 20 having a pair of inwardly formed legs 21 welded or otherwise secured to the bowl at 22. This bar, as will be observed more clearly in Fig. 2, not only limits the lowermost position of the lever 16 but also limits transverse or horizontal movement of the lever. The inner end 24 of the lever is displaced downwardly and carries the transverse cam 17 that may be welded or otherwise secured thereto.

The cam 17 in the illustrated embodiment of the invention has a compound curve as may be observed in Figs. 3 and 4. In Fig. 3 it will be seen that the right end of the cam has a gentle downward curve while the left end of the cam curves upwardly. In Fig. 4 it will be observed that the plan view of the cam is essentially arcuate. While the cam 17 may have any desired configuration, the arcuate form is preferred with the radius being determined by the distance between the bottom end of the stem or post 14 and the pivot 19.

Fig. 4 illustrates the adjustment of the cam to raise and lower the grill 13. When the lever 16 is in the position denoted by the numeral 16', the grill will be moved to the uppermost position. When the lever is in the position shown at 16" the grill will be moved to the lowermost position. For convenience in operation of the lever 16 the latter is provided with a knob 25 or other suitable handle so that it can be easily gripped and moved transversely of the bowl.

With the invention as described above a minimum depth is required for the lifting mechanism which materially decreases the space required for packing or storing the equipment and the only moving part required to affect a vertical adjustment is the lever 16 pivoted at 19 to the bowl. Thus the lifting mechanism not only provides a compact arrangement of elements that is dependable and easy to operate but also permits the grill 13 to be adjusted to any position between the upper and lower limits.

While only one embodiment of the invention has been illustrated and described it is apparent that alterations, changes and modifications will be made without departing from the true scope and spirit thereof.

What is claimed is:

A brazier comprising a bowl for receiving and holding fuel and including a central opening in the bottom thereof, a grill having a center post extending through said opening, a lever carried by a pivot at a point between its ends to the under side of said bowl and at a point on said bowl spaced from said opening, said pivot extending through the bowl and lever, said lever being moveable about said pivot in a generally horizontal plane, and a cam having inclined surfaces carried by said lever for engagement with the bottom of said post, said lever and cam upon movement through an angle in one direction about said pivot lowering said grill and upon movement in the other direction in said horizontal plane raising said grill.

References Cited in the file of this patent

UNITED STATES PATENTS

| | | |
|---|---|---|
| 407,869 | Monk | July 30, 1889 |
| 1,178,823 | Schwall | Apr. 11, 1916 |
| 1,244,184 | Dunwoodie | Oct. 23, 1917 |
| 1,751,938 | McKean | Mar. 25, 1930 |
| 1,786,562 | Endorf | Dec. 30, 1930 |
| 1,879,955 | Smith | Sept. 27, 1932 |
| 2,575,082 | Wolff | Nov. 13, 1951 |
| 2,733,332 | Mason | Jan. 31, 1956 |
| 2,747,567 | Goodwin | May 29, 7956 |
| 2,786,463 | Vincent | Mar. 26, 1957 |
| 2,804,068 | Miller et al. | Aug. 27, 1957 |
| 2,819,667 | Victor | Jan. 14, 1958 |